United States Patent
Fox et al.

(10) Patent No.: US 10,536,816 B1
(45) Date of Patent: Jan. 14, 2020

(54) MOBILE DEVICE THAT CREATES A COMMUNICATION GROUP BASED ON THE MOBILE DEVICE IDENTIFYING PEOPLE CURRENTLY LOCATED AT A PARTICULAR LOCATION

(71) Applicant: INTERNATIONAL BUSINESS MACHINES CORPORATION, Armonk, NY (US)

(72) Inventors: Jeremy R. Fox, Georgetown, TX (US); Gregory J. Boss, Saginaw, MI (US); Liam S. Harpur, Skerries (IE); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/104,444

(22) Filed: Aug. 17, 2018

(51) Int. Cl.
*H04W 4/08* (2009.01)
*G06K 9/00* (2006.01)
*H04W 4/80* (2018.01)

(52) U.S. Cl.
CPC .......... *H04W 4/08* (2013.01); *G06K 9/00288* (2013.01); *H04W 4/80* (2018.02)

(58) Field of Classification Search
None
See application file for complete search history.

(56) References Cited

U.S. PATENT DOCUMENTS

| 7,711,145 | B2 | 5/2010 | Gallagher | |
|---|---|---|---|---|
| 2006/0274949 | A1 | 12/2006 | Gallagher et al. | |
| 2008/0221403 | A1* | 9/2008 | Fernandez | A41H 3/007 600/301 |
| 2011/0208657 | A1* | 8/2011 | Rao | G06Q 20/105 705/67 |
| 2012/0090007 | A1* | 4/2012 | Xiao | H04N 5/44543 725/46 |
| 2017/0148296 | A1 | 5/2017 | Amir | |
| 2018/0150187 | A1* | 5/2018 | Artemyev | G06F 3/0481 |

FOREIGN PATENT DOCUMENTS

WO  2016038405 A1  3/2016

OTHER PUBLICATIONS

"How do smartphones work out what direction they are pointing?" [online] British Geological Survey 1998-2017, NERC © 2018 [retrieved Jul. 24, 2018], retrieved from the Internet: <http://www.bgs.ac.uk/eductationismartphones.html>, 4 pg.
(Continued)

*Primary Examiner* — Mohammed Rachedine
(74) *Attorney, Agent, or Firm* — Cuenot, Forsythe & Kim, LLC

(57) ABSTRACT

A plurality of people currently located at a particular location can be automatically identified by at least a first mobile device currently located at the particular location. Responsive to automatically identifying the plurality of people currently located at the particular location, the mobile device can automatically create a communication group including at least a portion of the plurality of people currently located at the particular location.

6 Claims, 5 Drawing Sheets

(56) References Cited

OTHER PUBLICATIONS

Hazas, M. et al., "A relative positioning system for co-located mobile devices," In Proc. of the 3rd Int'l. Conf. on Mobile Systems, Applications, and Services, ACM, Jun. 2005, pp. 177-190.

O'Sullivan, A., "Multiphono: Relative positioning of co-located mobile devices," Computer Science University of Maryland, Scholarly Paper, 2014, 9 pg.

"System and Method for efficiently identifying people and objects in media content by refining the search set using context information," IP.com Prior Art Database Technical Disclosure, IPCOM000233236D, Dec. 3, 2013, 4 pg.

"Automatic Real-Time Photo Distribution for Mobile Devices," IP.com Prior Art Database Technical Disclosure, IPCOM000245318d, Feb. 29, 2016, 5 pg.

"A method for people in different geographic locations to take group photos," IP.com Prior Art Database Technical Disclosure, IPCOM000253024D, Feb. 28, 2018, 3 pg.

Lee, S.K. et al., "Future of IoT networks: A survey," Applied Sciences, Oct. 16, 2017, vol. 7, No. 10, 25 pg.

Hossain, M.I., "Designing Efficient Access Control to Comply Massive-Multiservice IoT over Cellular Networks," Doctoral dissertation, Kungliga Tekniska hogskolan Royal Institute of Technology, 2017, 87 pg.

* cited by examiner

300

```
┌─────────────────────────────────────────────────────────────────┐
│ Automatically identify a plurality of people currently located  │
│                     at a particular location                    │
│                              305                                │
└─────────────────────────────────────────────────────────────────┘
                                │
                                ▼
┌─────────────────────────────────────────────────────────────────┐
│ Responsive to automatically identifying the plurality of people │
│ currently located at the particular location, automatically     │
│ create a communication group including at least a portion of    │
│ the plurality of people currently located at the particular     │
│ location                                                        │
│                              310                                │
└─────────────────────────────────────────────────────────────────┘
```

```
┌─────────────────────────────────────────────────────────────────┐
│ Capture or receive, at the particular location, at least one    │
│ image of the portion of the plurality of people currently       │
│ located at the particular location                              │
│                              405                                │
└─────────────────────────────────────────────────────────────────┘
                                │
                                ▼
┌─────────────────────────────────────────────────────────────────┐
│ Initiate image recognition processing on the at least one image │
│ of the people currently located at the particular location, the │
│ image recognition processing comprising performing facial       │
│ recognition processing on faces of the portion of the plurality │
│ of people depicted in the at least one image                    │
│                              410                                │
└─────────────────────────────────────────────────────────────────┘
                                │
                                ▼
┌─────────────────────────────────────────────────────────────────┐
│ Identify the portion of the plurality people based on results   │
│ of the facial recognition processing performed on the faces of  │
│ the portion of the plurality of people depicted in the at least │
│ one image                                                       │
│                              415                                │
└─────────────────────────────────────────────────────────────────┘
```

```
┌─────────────────────────────────────────────────────────────────┐
│ Capture or receive, at the particular location, at least one    │
│ image of the portion of the plurality of people currently       │
│ located at the particular location                              │
│                              505                                │
└─────────────────────────────────────────────────────────────────┘
                                 ↓
┌─────────────────────────────────────────────────────────────────┐
│ Initiate image recognition processing on the at least one       │
│ image of the portion of the plurality of people currently       │
│ located at the particular location, the image recognition       │
│ processing comprising determining features of at least one      │
│ garment worn by at least one person of the portion of the       │
│ plurality of the people depicted in the at least one image      │
│                              510                                │
└─────────────────────────────────────────────────────────────────┘
                                 ↓
┌─────────────────────────────────────────────────────────────────┐
│ Broadcast a message to other mobile devices currently located   │
│ at the particular location, the broadcast message indicating    │
│ the at least one determined feature of the at least one garment │
│ and requesting the person wearing the garment to respond to     │
│ the message                                                     │
│                              515                                │
└─────────────────────────────────────────────────────────────────┘
                                 ↓
┌─────────────────────────────────────────────────────────────────┐
│ Receive from a mobile device of the person wearing the garment  │
│ a response to the broadcast message indicating that person's    │
│ user information                                                │
│                              520                                │
└─────────────────────────────────────────────────────────────────┘
```

```
┌─────────────────────────────────────────────────────────────────┐
│ Receive respective data from other mobile devices used or       │
│ carried by the portion of the plurality of people currently     │
│ located at the particular location                              │
│                              605                                │
└─────────────────────────────────────────────────────────────────┘
                                 ↓
┌─────────────────────────────────────────────────────────────────┐
│ Identify the portion of the plurality of people currently       │
│ located at the particular location by processing the respective │
│ data, processing the respective data comprising determining     │
│ correlations between the respective data and respective ones    │
│ of the portion of the plurality of people                       │
│                              610                                │
└─────────────────────────────────────────────────────────────────┘
```

```
┌─────────────────────────────────────────────────────────────────────┐
│ Capture or receive, at the particular location, at least one image  │
│ of the portion of the plurality of people currently located at the  │
│ particular location                                                 │
│ 705                                                                 │
└─────────────────────────────────────────────────────────────────────┘
                                 ↓
┌─────────────────────────────────────────────────────────────────────┐
│ Read data from, or receiving data read from, at least one RFID tag, │
│ the data from the RFID tag including data indicating features of a  │
│ garment to which the RFID tag is attached and data about a person   │
│ wearing the garment                                                 │
│ 710                                                                 │
└─────────────────────────────────────────────────────────────────────┘
                                 ↓
┌─────────────────────────────────────────────────────────────────────┐
│ Initiate image recognition processing on the at least one image of  │
│ the people currently located at the particular location, the image  │
│ recognition processing comprising determining features of the       │
│ garment worn by the person                                          │
│ 715                                                                 │
└─────────────────────────────────────────────────────────────────────┘
                                 ↓
┌─────────────────────────────────────────────────────────────────────┐
│ Compare the data from the RFID tag indicating the features of the   │
│ garment to the features of the garment determined by the image      │
│ processing and, based on the comparison, determine whether the data │
│ from the RFID tag has at least a threshold level of correlation     │
│ with the features of the garment determined by the image processing │
│ 720                                                                 │
└─────────────────────────────────────────────────────────────────────┘
                                 ↓
┌─────────────────────────────────────────────────────────────────────┐
│ Responsive to determining that the data from the RFID tag has at    │
│ least the threshold level of correlation with the features of the   │
│ garment determined by the image processing, identify the data about │
│ the person wearing the garment and, based on the data about the     │
│ person wearing the garment, identifying the person wearing the      │
│ garment                                                             │
│ 725                                                                 │
└─────────────────────────────────────────────────────────────────────┘
```

```
┌─────────────────────────────────────────────────────────────────────┐
│ Read data from, or receive data read from, at least one RFID tag    │
│ worn by or carried by a person, the data from the RFID tag          │
│ including data about the person                                     │
│ 805                                                                 │
└─────────────────────────────────────────────────────────────────────┘
                                 ↓
┌─────────────────────────────────────────────────────────────────────┐
│ Based on the data about the person from the RFID tag, identify the  │
│ person                                                              │
│ 810                                                                 │
└─────────────────────────────────────────────────────────────────────┘
```

FIG. 8

MOBILE DEVICE THAT CREATES A COMMUNICATION GROUP BASED ON THE MOBILE DEVICE IDENTIFYING PEOPLE CURRENTLY LOCATED AT A PARTICULAR LOCATION

BACKGROUND

The present invention relates to data processing systems and, more specifically, to social collaboration using data processing systems.

Social collaboration, including text messaging, electronic mail and post to social networking systems, is a form of communication that continues to grow. Using social collaboration, people can participate in group conversations. In illustration, people in a communication group can share electronic messages with other members in the communication group, for example in a message thread. Within the message thread, the members of the communication group can read the electronic messages, create reply messages, etc.

SUMMARY

A method includes automatically identifying, by at least a first mobile device currently located at a particular location, a plurality of people currently located at the particular location. The method also can include, responsive to automatically identifying, by at least the first mobile device currently located at the particular location, the plurality of people currently located at the particular location, automatically creating, by at least the first mobile device, a communication group including at least a portion of the plurality of people currently located at the particular location.

A system includes a processor programmed to initiate executable operations. The executable operations include automatically identifying, by at least a first mobile device currently located at a particular location, a plurality of people currently located at the particular location. The executable operations also can include, responsive to automatically identifying, by at least the first mobile device currently located at the particular location, the plurality of people currently located at the particular location, automatically creating, by at least the first mobile device, a communication group including at least a portion of the plurality of people currently located at the particular location.

A computer program product includes a computer readable storage medium having program code stored thereon. The program code is executable by a data processing system to initiate operations. The operations include automatically identifying, by at least a first mobile device currently located at a particular location, a plurality of people currently located at the particular location. The operations also can include, responsive to automatically identifying, by at least the first mobile device currently located at the particular location, the plurality of people currently located at the particular location, automatically creating, by at least the first mobile device, a communication group including at least a portion of the plurality of people currently located at the particular location.

BRIEF DESCRIPTION OF THE DRAWINGS

FIG. 3 is a flowchart illustrating an example of a method of creating a communication group.

FIG. 4 is a flowchart illustrating an example of a method of automatically identify a plurality of people currently located at the particular location.

FIG. 5 is a flowchart illustrating an example of another method of automatically identify a plurality of people currently located at the particular location.

FIG. 6 is a flowchart illustrating an example of another method of automatically identify a plurality of people currently located at the particular location.

FIG. 7 is a flowchart illustrating an example of another method of automatically identify a plurality of people currently located at the particular location.

FIG. 8 is a flowchart illustrating an example of another method of automatically identify a plurality of people currently located at the particular location.

DETAILED DESCRIPTION

Figure 1:
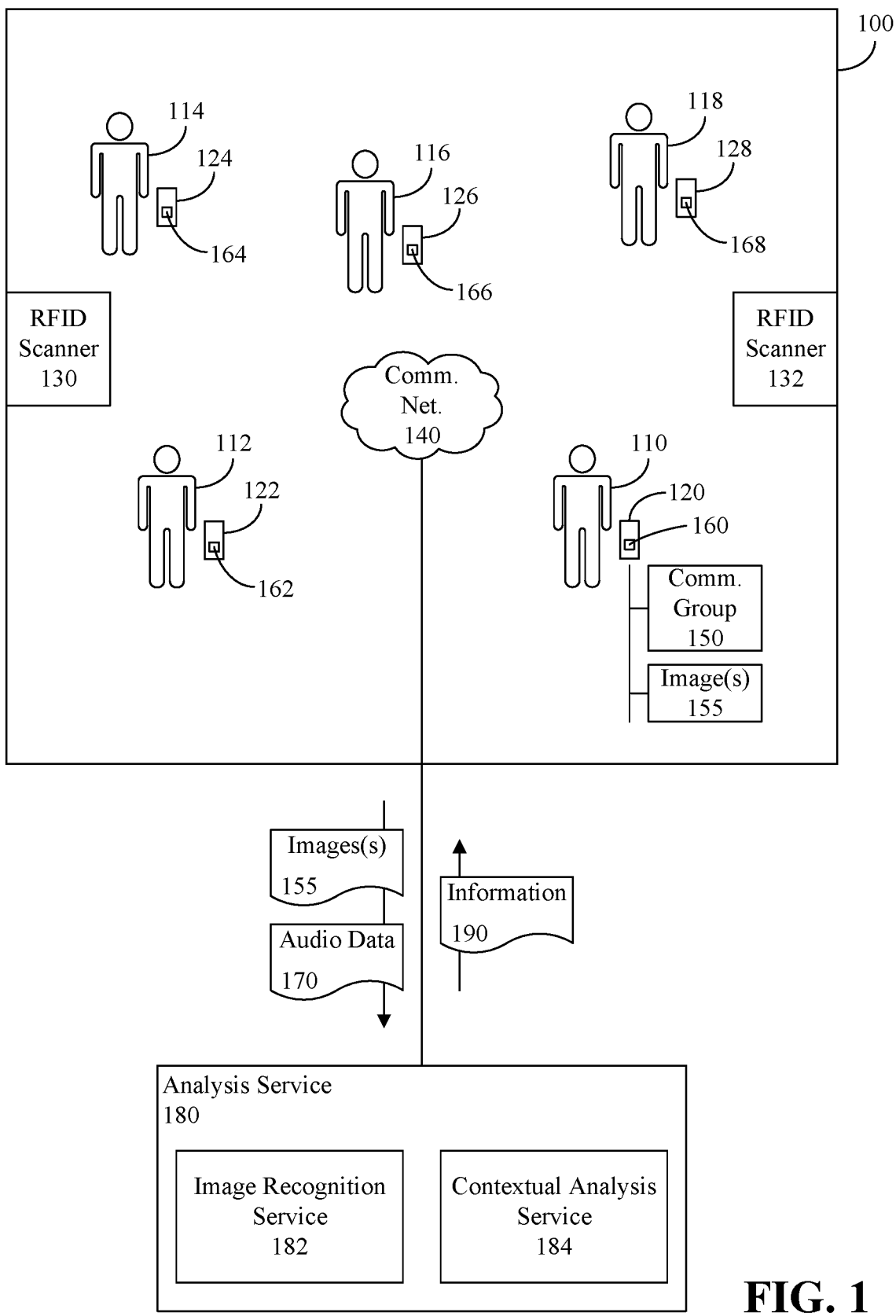
FIG. 1 is a block diagram depicting a plurality of people located at a particular location.

This disclosure relates to data processing systems and, more specifically, to social collaboration using data processing systems.

In accordance with the inventive arrangements disclosed herein, a mobile device can automatically identify a plurality of people currently located at the particular location. For example, the mobile device can capture or receive at least one image depicting the people, and initiate image recognition on the image(s) to identify the people. The mobile device also can identify the people by reading data from radio frequency identifier (RFID) tags, or receiving data read from the RFID tags by an RFID scanner. Further, image processing on the image(s) in combination with the RFID data can be used to identify the people. Responsive to identifying the people, the mobile device can automatically create a communication group that includes the people.

The arrangements described herein to automatically create the communication group can greatly improve used of the mobile device by the user of the mobile device. Specifically, rather than a user of the mobile device asking each of the people for their user identifiers and/or communication addresses, creation of the communication group can be initiated merely by the user using the mobile device to capture images of the people and/or by the mobile device accessing data read from RFID tags carried or worn by the people.

Several definitions that apply throughout this document now will be presented.

As defined herein, the term "location" means a geographic location. Examples of a location include a room, a store, a restaurant, an outdoor area, and the like. A web page, web-based service (e.g., a social networking service), a view presented on a display, an element of a user interface, an element presented by a user interface, a system, a device, and the like are not locations as the term "location" is defined herein.

As defined herein, the term "communication group" means a functional data structure including a list of contacts, wherein the functional data structure is user selectable to include each of the contacts as recipients of an electronic message without need for the user to select each of the contacts individually. The list of contacts includes, for each contact, at least a user identifier and/or one or more communication addresses for the contact.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "mobile device" means portable device configured to be carried by, or worn by, a person. For example, a mobile device can be a mobile communication device or a radio frequency identification (RFID) tag. Network infrastructure, such as routers, firewalls, switches, access points, RFID readers per se (e.g., stand-alone RFID readers), and the like, are not mobile devices as the term "mobile device" is defined herein, though a mobile device may include an RFID reader among other types of devices.

As defined herein, the term "mobile communication device" means a data processing system that requests shared services from a server, and with which a user directly interacts. Examples of a mobile communication device include, but are not limited to, a smartphone, a tablet computer, a personal digital assistant, a smart watch, smart glasses, a camera, and the like. Network infrastructure, such as routers, firewalls, switches, access points and the like, are not mobile communication devices as the term "mobile communication device" is defined herein.

As defined herein, the term "server" means a data processing system configured to share services with one or more other data processing systems.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

As defined herein, the term "contact" means a person (i.e., a human being).

FIG. 1 is a block diagram depicting a plurality of people 110, 112, 114, 116, 118 located at a particular location 100. The location 100 can be, for example, a store, a restaurant, a lounge, a theater, an office, a home, etc. The location 100 can be an indoor space, an outdoor space, or a venue with both an indoor space and an outdoor space.

Each person 110-118 can have at least one respective device 120, 122, 124, 126, 128. For example, the people 110-118 can hold the respective mobile devices 120-128, have the respective mobile devices 120-128 in their purses or pockets, have the respective mobile devices 120-128 within reach (e.g., sitting nearby on a table), have the respective mobile devices 120-128 integrated with the garments worn by the people 110-118, etc. Examples of the mobile devices 120-128 include, but are not limited to, mobile communication devices (e.g., smartphones, tablet computers, laptop computers, smart watches, smart glasses, etc.), cameras, radio frequency identifier (RFID) tags, and so on. Although various types of mobile devices 120-128 are not cameras, per se, mobile devices oftentimes include cameras that are used to capture images (e.g., still images and/or video).

One or more RFID scanners 130, 132 can be positioned at the location 100. The RFID scanners 130, 132 can be configured to scan RFID tags of the people 110-118 to read data from the RFID tags. The RFID scanners 130, 132 can be communicatively linked to a communication network 140, and communicate the data read from the RFID tags to one or more of the mobile devices 120-128 and/or another system via the communication network 140.

The communication network 140 is the medium used to provide communications links between various devices and data processing systems connected together within a computing environment. The communication network 140 may include connections, such as wire, wireless communication links, or fiber optic cables. The communication network 140 can be implemented as, or include, any of a variety of different communication technologies such as a wide area network (WAN), a local area network (LAN), a wireless network (e.g. WiFi™), a mobile network, a Virtual Private Network (VPN), the Internet, the Public Switched Telephone Network (PSTN), a personal area network (PAN) (e.g., Bluetooth®, ZigBee®, etc.) or similar technologies.

In operation, a mobile device, such as the mobile device 120, currently located at the particular location 100 can automatically identify a plurality of people 110-118 currently located at the particular location 100. Responsive to identifying the plurality of people 110-118, the mobile device 120 can automatically create a communication group 150 including at least a portion of the plurality of people 110-118 currently located at the particular location 100. The mobile device 120 also can automatically assign a name to the communication group 150.

In illustration, the user 110 can use a camera of the mobile device 120 to capture at least one image 155 at the location 100 including the people 110-118 or including the people 112-118. In another arrangement, the mobile device 120 can receive from another mobile device 122-148 such an image or images 155. Other mobile devices 122-128 also can capture images and communicate the images to the mobile device 120. In such case, the user 110 can designate the mobile device 120 to be a master device for handling the images 155, and designate the other mobile devices 122-128 as child devices with respect to the handling the images 155. The child devices can be configured to automatically communicate images captured by the child devices to the master device while the child devices are currently located at the location 100.

By way of example, the mobile device 120 and one or more of the mobile devices 122-128 can execute a social application 160, 162, 164, 166, 168 (e.g., a mobile application). The social application 160-168 can be used to create and manage the communication group 150, as well as coordinate sharing and processing of images 155. Via a menu of the social application 160 presented by a user interface of the mobile device 120, the person 110 can designate the mobile device 120 to be the master device, and initiate the mobile device 120 to communicate messages to the social application 162-168 executed on the other mobile devices 122-128 requesting the people 112-118 to choose whether to participate in the sharing and processing of the images 155.

In illustration, the social application 160 can communicate the message to a server (e.g., a social networking service) and indicate to the server the current location of the mobile device 120, for example using global positioning system (GPS) coordinates determined by a GPS receiver of the mobile device 120 while the mobile device 120 is present at the location 100. Based on the location information, the analysis service 180 can identify one or more other mobile devices 122-128 executing the social application 162-168 present at the location 100. The server can communicate the message to the social application 162-168 executing on such mobile devices 122-128, which can present the message to the respective people 112-118 via user interfaces of the respective mobile devices 122-128, for example on displays of the respective mobile devices 122-128.

The social application 162-168 executing on the respective mobile devices 122-128 can present the message to the respective people 112-118 prompting the people 112-118 to enter user inputs indicating whether the people 112-118 choose to participate in image sharing with the person 110/mobile device 120. If a person 112-118 chooses to participate, the social application executed the social application 162-168 on that person's mobile device 122-128 can set itself into child mode, and automatically communicate any images captured by the mobile device 122-128 to the social application 160 executing on the mobile device 120.

In an aspect of the present arrangements, as the master device, the mobile device 120 can communicate, via the social application 160-168, with the mobile devices 122-128 (child devices) to manage viewable augmented reality (AR) operations performed by the mobile devices 120-128, as well as Internet of Things (IoT) information, for use in presenting AR content in the image(s) 155. Accordingly, the mobile device 120 can coordinate movement and/or summarization of appropriate AR information for each image 155 before the image 155 is captured, as well as coordinate sharing of the image(s) 155 on one or more social networking services.

Table 1 presents example data the mobile device 120 may generate/obtain/manage in order to manage the A/R operations.

TABLE 1

| DeviceID | DeviceTransmissionTime | Data Content |
|---|---|---|
| Rfid-6727 | Active (Ad hoc request) | Field:UserName->JoeBloggs Field: UserMail '->JoeBloggs@xyz.com |
| IoT-3423ac3 | Transmit in 40 seconds | <Temperature>/22DegreesC |
| Augmented Reality-45292 | Ad hoc | BLOB-Address-329422 |
| SocialNetwork-4222 | Transmit in 15 seconds | SocNet-ID-847321 |

Table 1 can include a variety of fields (i.e., columns) and records (i.e., rows). The first field can include data representing identifiers for devices/systems from which information is obtained and/or to which information is to be sent, the second field can include data representing anticipated or actual device transmission times for communicating with the devices/systems indicated in the first field, and the third field can include data representing data content received, sent, or to be sent to the devices/systems indicated in the first field.

By way of example, the first record can indicate the mobile device 122, which in this example is an RFID tag, to which the mobile devices 120 is actively reading and made an ad hoc request to obtain a user name and user e-mail address. The second record can indicate an IoT device from which the mobile device 120 receives a temperature reading, and which will again transmit an updated temperature reading in forty seconds. The mobile device 120 can add the temperature to one or more image(s) 155 and/or otherwise process the temperature as contextual information. The third record can indicate an AR service with which the mobile device has an ad hoc communication link and AR content received from the AR service. The mobile device 120 can add the AR content to one or more of the image(s) 155. The fourth record can indicate a social network which the mobile device 120 is accessing, a time when the mobile device 120 will transmit the image(s) 155 to the social network, and a social network identifier for the social networking account under which the image(s) 155 will be uploaded.

Responsive to capturing an image 155, receiving an image 155 from another mobile device 122-128, or receiving a user input from the user 110 indicating the user 110 desires to form a communication group 150 based on the image(s) 155, the social application 160 executing on the mobile device 120 can initiate, in real time, an analysis to be performed on the image(s) 155 to identify each of the people 110-118 (or people 112-118) depicted in the image 155. The social application 160 also can initiate an analysis to be performed on other contextual information obtained by the mobile device 120, for example audio signals recorded at the location 100, such as spoken utterances. The social application 160 can initiate the mobile device 120 can record the audio signals to generate audio data 170, or receive the audio data 170 from another mobile device 122-128 or another sound recording device (not shown) at the location 100. For example, the social application 162-168 executing on the mobile devices 122-128 can record audio signals at the location 100 and communicate corresponding audio data to the social application 160. Further, the analysis can include processing other contextual information available at the location 100, for example contextual information received from the RFID scanners 130, 132, other mobile devices 112-120 and/or other IoT devices present at the location 100.

The mobile device 120, for example using the social application 160, can communicate, in real time via the communication network 140, the image(s) 155 and audio data 170 to an analysis service 180. The analysis service 180 can include, or otherwise interface with, image recognition service 182 that performs image recognition processing (hereinafter "image recognition") on images. The image recognition can include facial recognition processing (hereinafter "facial recognition") on faces of the people 110-118 depicted in the image(s) 155 and object recognition processing (hereinafter "object recognition") on objects depicted in the image(s) 155, for example, garments worn by the people 110-118. The analysis service 180 further can include, or otherwise interface with, a contextual analysis service 184 that performs contextual analysis on results of the image recognition analysis, the audio data 170 and/or any other contextual data provided to, or determined by, the analysis service 180.

The analysis service 180, for instance, can be a service provided by a social networking system, for instance a social networking system that provides a social networking service for which the person 110 is a registered user. Nonetheless, the present arrangements are not limited in this regard and other analysis services may be used. An example of another analysis service 180 is an artificial intelligence (AI) service provided by an AI system. One such AI system is the Watson™ system that is available from the International Business Machines (IBM) Corporation of Armonk, N.Y. The Watson™ system is an application of advanced natural language processing, information retrieval, knowledge representation and reasoning, and machine learning technologies to the field of open domain question answering.

The image recognition service 182 can perform, in real time, image recognition on the image(s) 155 using image recognition software executed by at least one processor of a processing system, which is known to those or ordinary skill in the art. By performing the image recognition on the image(s) 155, which can include facial recognition, the image recognition service 182 can identify each of the people 110-118 that are depicted in the image(s) 155. Responsive to identifying such people 110-118 using the image recognition service 182, the analysis service 180 can identify, in real time, information 190 pertaining to the people 110-118. The information 190 can include names, user identifiers, communication addresses (e.g., telephone numbers, e-mail addresses, instant messaging addresses, text messaging addresses, etc.), mobile device identifiers for the mobile devices 120-128 used by the people 110-118 (e.g., media access control (MAC) addresses, internet protocol (IP) addresses, personal area network (PAN) addresses, etc.).

The analysis service 180 can identify, in real time, the information pertaining to the people 110-118 by determining a user identifier for each person depicted in the image(s) 155 and searching one or more databases for other information associated with the determined user identifier. In illustration, assume the analysis service 180 is provided by a social networking system with which each of the people 110-118 have a user account. The social networking system can use known techniques to store data representing facial characteristics of each of the people 110-118 based on previous images uploaded to the social networking system in which the people 110-118 were tagged. The social networking system can store the facial characteristics data for each person 110-118 in that person's user profile. Further, for each person 110-118, the social networking system also can store various other information about each person 110-118, such as the person's name, communication addresses, mobile devise identifiers, and so on. Responsive to the image recognition service 182 performing image recognition (e.g., facial recognition) on the image(s) 155 using the stored facial characteristics data, the analysis service 180 can interface with other components of the social networking system to obtain other information stored by the social networking system for each person 110-118 identified in the image(s) 155. In an aspect of the present arrangements, the analysis service 180 further can interface with one or more other social networking systems to perform image recognition and obtain information pertaining to the people 110-118.

The analysis service 180 also can identify other information in the images. For example, the image recognition service 182 can analyze the image(s) 155 to identify features of garments worn by the people 110-118, for example garment types, garment colors, garment materials, garment styles, garment distinguishing features (e.g., holes and where they are located), etc. The analysis service 180 can generate metadata indicating the garment features, and assign the metadata to the image(s) 155. In this regard, the analysis service 180 can indicate which person 110-118 depicted in the image(s) 155 is wearing the garment indicated by the metadata.

In another example, the analysis service 180 also can identify contextual information contained in the image(s). Such contextual information can include, for example, information that indicates a reason, purpose or subject associated with the gathering of the people 110-128. For instance, the image recognition service 182 can identify ornaments, such as balloons, flowers, banners, etc., depicted in the image(s) 155, identify presents depicted in the image(s) 155, identify in the images depictions of the people 110-118 participating in activities (e.g., playing games, watching sporting events, dancing, singing, etc.), and so on.

The image recognition service 182 can communicate results of the various analyses performed to the contextual analysis service 184. The contextual analysis service 184 can process such results, as well as the audio data 170, to determine a context of the gathering of the people 110-118 at the location 100. For instance, the contextual analysis service 184 can text on banners or other ornaments within the location 100 and perform natural language processing and/or semantic analysis on the text to determine a context represented by the text, determine a context associated with the types of ornaments, determine a context indicated by activities depicted in the image(s) being performed by the people 110-118, and so on. Further, the contextual analysis service 184 can process the audio data 170 to identify spoken utterances of the people 110-118 and songs sung by the people 110-118 using speech recognition, and determine a context of such spoken utterances/sounds. For instance, the contextual analysis service 184 can identify people 110-118 saying or singing "happy birthday," congratulatory spoken utterances, utterances related to sporting events being watched, utterances related to games being played, and so on. The contextual analysis service 184 also can identify other sounds recorded at the location 100 to determine a context of such audio signals, for examples sounds emanating from televisions, audio systems, background noise, etc. The contextual analysis service 184 can determine a context of the image(s) 155 based on processing the various contextual information identified.

To process text identified in the image(s) 155 and the audio data 170, the contextual analysis service 184 can implement natural language processing (NLP) and semantic analysis on information contained in the text and audio data. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the contextual analysis service 184 to implement NLP and semantic analysis.

The analysis service 180 also can obtain other contextual data related to the location 100 and/or people 110-118, and process such contextual data as part of the analyses for generating the information 190. For example, the mobile device 120 can collect such contextual data from the other mobile devices 120-128 (e.g., from RFID tags), the RFID scanners 130, 132 and/or other IoT devices present at the location 100. In another example, the mobile device 120 can communicate to the analysis service 180 location information for the location 100, for example GPS coordinates determined by a GPS receiver of the mobile device 120 while the mobile device 120 is present at the location 100. Based on the location information, the analysis service 180 can identify the other mobile devices 120-128 present at the location 100, as well as the RFID scanners 130, 132 and/or other Internet of Things (IoT) devices present at the location 100. Assuming security settings for such devices allowing sharing of contextual data with the analysis service 180, the analysis service 180 can access the contextual data from the mobile devices 110-120, the RFID scanners 130, 132 and/or other Internet of Things (IoT) devices present at the location 100.

The analysis service 180 can communicate information 190 resulting from the various analyses the mobile device 120 via the communication network 140. The information 190 can include identifiers and/or other information pertaining to the people 110-118 identified in the image(s) 155, as well as contextual information determined based on the analysis service 180 processing the image(s) and audio data 170. In an aspect of the present arrangements, the analysis service 180 can generate the information 190 as metadata and assign the metadata to the image(s) 155. For example, the analysis service 180 can add the metadata to image files for the images 155, and communicate the image files to the mobile device 120.

Responsive to receiving the information 190 from the analysis service 180, the mobile device 120 can automatically create the communication group 150. The mobile device 120 can include in the communication group 150 each of the people 110-118 identified in the image(s) 155. Even if the user 110 of the mobile device 120 is not indicated in the information 190, the mobile device 120 still can include the user 110 in the communication group 150. Further, based on contextual data included in the information 190, the mobile device can generate a name for the communication group 150, and assign that name to the communication group. For example, assume that the contextual information indicates "Joe's birthday party" and time/date stamps assigned to the images 155 indicate a year 2018. Based on that contextual information, the mobile device 120 can name the communication group "Joe's birthday party-2018." Further, based on the contextual information, the mobile device 120 can name the images 155 "Joe's birthday party-2018_x," where "x" is unique identifier assigned to each image 155, and assign that names to the images 155 using metadata. In another aspect, the analysis service 180 can assign the names to the images 155 using metadata. Automatically naming the images 155 in this manner can facilitate the people 110-118 finding and accessing the images 155.

Via a user interface presented by the mobile device 120, the user 110 can selectively modify the communication group 150, for example by manually adding one or more additional people 110-118 to the communication group 150, manually removing one or more people 110-118 from the communication group 150, changing the name of the communication group 150, etc. In illustration, the user interface of the mobile device 120 can present a listing of the people 110-118 in the communication group 150, which the user 110 can scroll through. The user interface further can provide one or more user interface controls (e.g., icons, buttons, menu items, etc.) selectable by the user 110 to initiate desired changes to the communication group 150.

In some cases, the identity of one or more of the people 110-118 may not be identified by the image recognition performed on the image(s) 155. For example, a person's back may be to the camera, the person's face may be partially obscured by other people or objects, or the image recognition service 182 may not have access to facial characteristics data that may be used to recognize a person 112. The image recognition service 182 can add, in real time, to the image(s) 155 metadata indicating people 110-118 depicted in the image(s) 155 that are not recognized, and communicate, in real time via the communication network 150, the image(s) 155 with the metadata to the mobile device 120. Further, the image recognition service 182 can analyze the image(s) 155 to identify features of garments worn by the people 110-118, for example garment types, garment colors, garment materials, garment styles, garment distinguishing features (e.g., holes and where they are located), etc. The analysis service 180 can include in the information 190 metadata indicating the garment features and assign that metadata to the image(s) 155. In this regard, the analysis service 180 can indicate which person 110-118 depicted in the image(s) 155 is wearing the garment indicated by the metadata.

Responsive to receiving the image(s) 155 with the metadata, the mobile device 120 can analyze the image(s) 155 and metadata and determine a direction of the unidentified people 112-118 relative to camera of the mobile device 120 when the image(s) 155 was/were captured. For example, the mobile device 120 can include one or more direction sensing devices (e.g., magnetic field sensors, gravity field sensors, accelerometers, a compass, etc.), and use the direction sensing device(s) to identify a direction the camera of the mobile device 120 was pointing when the image(s) 155 was/were captured. The mobile device 120 can include with the image(s) 155 metadata indicating such direction. Responsive to receiving the image(s) 155 from the image recognition service 182 with the metadata indicating people 112-118 depicted in the image(s) 155 that were not identified, the mobile device 120 can analyze the image(s) 155 and metadata to determine the direction of the unidentified people 112-118 relative to camera of the mobile device 120 using techniques known to those skilled in the art.

Further, the mobile device 120 can use direction based mobile device identification known to those skilled in the art to identify the mobile devices 122-128 located in the determined direction with respect to the mobile device 120. In illustration, images 155 captured by two or more of the mobile devices 120-128 can depict structural elements at the location 100, for example a ceiling and/or scene above the people 112-118, and the social application 160 can combine those images using techniques known in the art (e.g., stitching together of images). Based on that process, the social application 160 can determine the relative locations of the mobile devices 120-128 to one another.

In a further arrangement, the mobile devices 122-128 can include ultrasonic transmitters configured to transmit ultrasonic signals in predetermined time slots. The mobile device 160 can include an ultrasonic sensor configured to receive ultrasonic signals generated by each of the respective ultrasonic transmitters of the mobile devices 122-128. Further, the mobile device 120 (e.g., the mobile application 160) can measure the peak values of the ultrasonic signals and the time differences between the predetermined time slots the ultrasonic signals are transmitted and the actual times the ultrasonic signals are received by the mobile device 120. The mobile device 120 also can determine an angle of arrival estimate derived using known orientations of the ultrasonic transmitters and calculate a relative spread of peak signal values measured across the ultrasonic transmitters.

Regardless of how the mobile device 120 determines the directions of the mobile devices 122-128 relative to the mobile device 120, the mobile device 120 can send to each of those mobile devices 122-128 a directional message asking the person 112-118 using the mobile device 122-128 to participate in the communication group 150, for example using a PAN communication link. Each person 112-118 choosing to participate in the communication group 150 can initiate their respective mobile device 122-128 to communicate a response to the direction message indicating the respective person's user identifier, communication address, etc. Responsive to receiving the response, the mobile device 120 can add the person 112-118 to the communication group 150.

For each person 112-118 indicated in the image(s) 155 whose identity is not determined by the image recognition, the mobile device 120 can process the metadata provided with the image by the image recognition service 182 to identify features of at least one garment worn by such person 112-118. The mobile device 120 can broadcast a message to each of the mobile devices 122-128 indicating the identified garment features and requesting the person 112-118 wearing that garment to participate in the communication group 150. In an aspect of the present arrangements, the mobile device 120 can broadcast the message via the social application 160-168. The social application 160 executing on the mobile device 120 can communicate the message to the social application 162-168 executing on the respective mobile devices 122-128. In another aspect of the present arrangements, the communication network 140 can include a wireless network (e.g., a WiFi™ network) at the location 100, and the wireless network can be configured to allow mobile devices 122-128 which are communication devices (e.g., smartphones, etc.) to broadcast messages to other mobile devices 122-128 that are communication devices that are connected to the wireless network. Accordingly, the mobile device 120 can broadcast the message to via the wireless network. In a further aspect, the mobile device 120 can broadcast the message via one or more PAN communication links established between the mobile device 120 and the mobile devices 122-128.

If a person 112-118 receiving the broadcast message and wearing the garment identified in the broadcast message chooses to participate in the communication group 150, the person 112-118 can initiate his/her respective mobile device 122-128 to communicate a response to the broadcast message indicating the respective person's user information, such as a user identifier, a communication address, etc. Responsive to receiving the response, the mobile device 120 can add the person 112-118 to the communication group 150.

In an aspect of the present arrangements, the mobile device 120 can detect mobile devices 122-128 which are, or include, RFID tags and read RFID data from the RFID tags. In a further aspect, one or the RFID scanners 130, 132 can detect mobile devices 122-128 which are, or include, RFID tags, read data from the RFID tags, and communicate the RFID data to the mobile device 120. In cases in which the RFID tags are attached to garments worn by people 112, 118, the RFID data read from each RFID tag can include, for example, an identifier identifying the garment, for example a type of the garment, a color of the garment, a material from which the garment is made, a style of the garment, distinguishing features of the garment, etc. Further, the RFID data read from each RFID tag can include, for the person 112-118 with whom the RFID tag is associated (e.g., the person 112-118 wearing or carrying the RFID tag), information about the person 112-118, such as a user name, a user identifier, a communication address, a mobile device identifier, etc.

Based on the data received from the RFID tags and the information 190 received from the analysis service 180 pertaining to the garments identified in the image(s) 155, the mobile device 120 can determine which people 110-118 are depicted in the image(s) 155. The mobile device 120 can create the communication group 150, and add to the communication group the determined people 112-118 depicted in the images, as well as the user 110 of the mobile device 120.

For example, the mobile device 120 can determine correlations between the data read from the RFID tags and respective ones of the plurality of people 110-118 depicted in the image(s) 155, and the people 110-118 depicted in the image(s) 155 can be identified based on such correlations. In illustration, the information 190 received from the analysis service 180 can include data, identified by the image recognition performed in the image(s) 155, indicating features of garments worn by the people 112-118. Further, the data read from the RFID tags can include data indicating features of garments to which the RFID tags are attached, as well as information about the people 112-118 wearing the garments. The mobile device 120 can compare the read from the RFID tags to the information 190 to determine a level of correlation between the data in the information 190 and the data read from each RFID tag. To determine the level of correlation, the mobile device 120 can determine a number of garment features in the information 190 that correspond to garment features in the data from the RFID tag. The level of correlation can be, for example, a percentage of garment features in the data from the RFID tag that match garment features in the information 190. For instance, if the garment features read from the RFID tag indicates jeans, blue, size 4, hole in right knee, and the garment features in the information 190 indicates jeans, blue, hole in right knee, the mobile device can determine there is a 75% level of correlation. The mobile device can identify the RFID tags for which the read data have at least a threshold level of correlation with the data in the information 190 that indicates features of a respective garment. The threshold level of correlation can be, for example, 25%, 50%, 75% or 100%. Having identified the RFID tags of the garments, the mobile device 120 can identify the information read from the RFID tags about the people 112-118 wearing the garments, and add those people 110-118 to the communication group 150.

In another arrangement, the analysis service 180 can obtain the RFID data from the RFID scanners 130, 132 and/or the mobile device 120. Based on the RFID data and the determined information 190 pertaining to the garments identified in the image(s) 155, the analysis service 180 can determine which people 110-118 are depicted in the image(s) 155, for example as described above, and generate metadata for the image(s) 155 indicating those people 110-118. The analysis service 180 can communicate the metadata to the mobile device 120. In response, the mobile device 120 can create the communication group 150, and add to the communication group the determined people 112-118 depicted in the images, as well as the user 110 of the mobile device 120.

In a further aspect of the present arrangements, the people 110-118 present at the location 100 can be identified based on the RFID data received from the mobile devices 120-128 and/or the RFID scanners 130, 132. In illustration, the mobile device 120 can receive from the mobile devices 122-128 and/or the RFID scanners 130, 132 RFID data indicating the people 112-118 associated with the respective mobile devices 122-128 (e.g., a user name, a user identifier, a communication address, a mobile device identifier, etc.). Based on such RFID data, the mobile device 120 can create the communication group 150, including in the communication group the people 112-118 and the user 110 of the mobile device 120.

Figure 2:
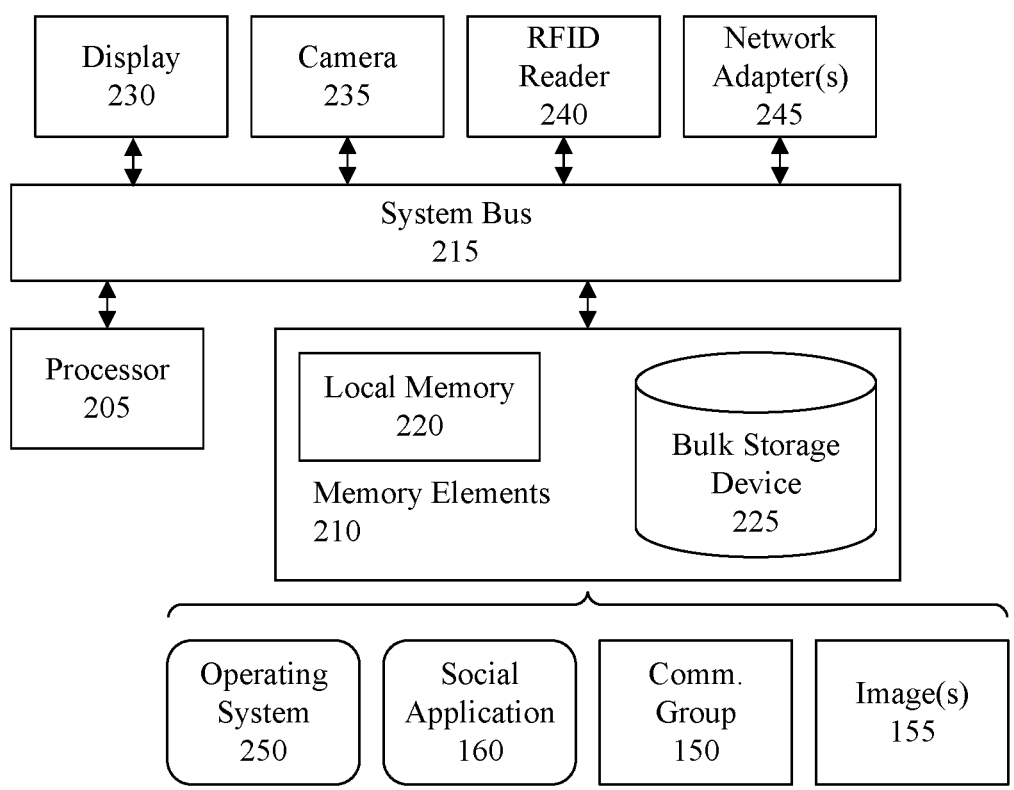
FIG. 2 is a block diagram illustrating example architecture for a mobile device.

FIG. 2 is a block diagram illustrating example architecture for the mobile device 120, for example in an arrangement in which the mobile device is a mobile communication device. One or more of the mobile devices 122-128 can be configured in a similar manner and/or one or more of the mobile devices 122-128 can be RFID tags.

The mobile device 120 can include at least one processor 205 (e.g., a central processing unit) coupled to memory elements 210 through a system bus 215 or other suitable circuitry. As such, the mobile device 120 can store program code within the memory elements 210. The processor 205 can execute the program code accessed from the memory elements 210 via the system bus 215. It should be appreciated that the mobile device 120 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The mobile device 120 also can include one or more cache memories (not shown) that provide temporary storage of at least some program code in order to reduce the number of times program code must be retrieved from the bulk storage device 225 during execution.

Input/output (I/O) devices such as a display 230, a camera 235 and, optionally, an RFID reader 240 can be coupled to the mobile device 120. The I/O devices can be coupled to the mobile device 120 either directly or through intervening I/O controllers. The display 230 can include a touchscreen and/or the mobile device 120 further can include a keypad and pointing device. One or more network adapters 245 also can be coupled to mobile device 120 to enable the mobile device 120 to become coupled to other systems, computer systems, remote printers, and/or remote storage devices through intervening private or public networks. Wireless modems and transceivers are examples of different types of network adapters 245 that can be used with the mobile device 120.

As pictured in FIG. 2, the memory elements 210 can store the components of the mobile device 120, namely an operating system 250, the social application 160, the communication group 150 and the image(s) 155. Being implemented in the form of executable program code, the operating system 250 and the social application 160 can be executed by the mobile device 120 and, as such, can be considered part of the mobile device 120. Moreover, the operating system 250, social application 160, communication group 150 and image(s) 155 are functional data structures that impart functionality when employed as part of the mobile device 120.

The mobile device 120 can output the communication group 150 to the memory elements 210 and store the communication group 150 in the memory elements 210. The mobile device 120 also can communicate the communication group 150 to other devices and/or systems, for example to other mobile devices and/or to one or more servers.

FIG. 3 is a flowchart illustrating an example of a method 300 of creating a communication group 150. The method 300 can be implemented by the social application 160 executing on the mobile device 120 while the mobile device is located at a particular location 100 (FIG. 1).

At step 305, the mobile device 120 can automatically identify a plurality of people currently located at the particular location. At step 310, responsive to the mobile device 120 automatically identifying the plurality of people currently located at the particular location, the mobile device 120 can automatically create a communication group including at least a portion of the plurality of people currently located at the particular location.

FIG. 4 is a flowchart illustrating an example of a method 400 of automatically identify a plurality of people currently located at the particular location at step 305 of FIG. 3. The method 400 can be implemented by the social application 160 executing on the mobile device 120 while the mobile device is located at a particular location 100 (FIG. 1).

At step 405 the mobile device 120 can capture or receive, at the particular location, at least one image of the portion of the plurality of people currently located at the particular location. At step 410 the mobile device 120 can initiate image recognition processing on the at least one image of the people currently located at the particular location, the image recognition processing comprising performing facial recognition processing on faces of the portion of the plurality of people depicted in the at least one image. At step 415 the mobile device 120 can identify the portion of the plurality people based on results of the facial recognition processing performed on the faces of the portion of the plurality of people depicted in the at least one image.

In an aspect of the present arrangements, the at least one image can comprise a plurality of images including a first image and at least a second image. The mobile device 120 can capture the first image, and mobile device 120 can receive the second image from another mobile device located at the particular location. The mobile device 120 can be designated as a master device for handling the plurality of the images and the other mobile device can be designated as a child device with respect to handling the plurality of the images.

FIG. 5 is a flowchart illustrating an example of another method 500 of automatically identify a plurality of people currently located at the particular location at step 305 of FIG. 3. The method 500 can be implemented by the social application 160 executing on the mobile device 120 while the mobile device is located at a particular location 100 (FIG. 1).

At step 505 the mobile device 120 can capture or receive, at the particular location, at least one image of the portion of the plurality of people currently located at the particular location. At step 510 the mobile device 120 can initiate image recognition processing on the at least one image of the portion of the plurality of people currently located at the particular location, the image recognition processing comprising determining features of at least one garment worn by at least one person of the portion of the plurality of the people depicted in the at least one image. At step 515 the mobile device 120 can broadcast a message to other mobile devices currently located at the particular location, the broadcast message indicating the at least one determined feature of the at least one garment and requesting the person wearing the garment to respond to the message. At step 520 the mobile device 120 can receive from a mobile device of the person wearing the garment a response to the broadcast message indicating that person's user information.

FIG. 6 is a flowchart illustrating an example of another method 600 of automatically identify a plurality of people currently located at the particular location at step 305 of FIG. 3. The method 600 can be implemented by the social application 160 executing on the mobile device 120 while the mobile device is located at a particular location 100 (FIG. 1).

At step 605 the mobile device 120 can receive respective data from other mobile devices used or carried by the plurality of people currently located at the particular location. At step 610 the mobile device 120 can identify the portion of the plurality of people currently located at the particular location by processing the respective data, processing the respective data comprising determining correlations between the respective data and respective ones of the portion of the plurality of people.

FIG. 7 is a flowchart illustrating an example of another method 700 of automatically identify a plurality of people currently located at the particular location at step 305 of FIG. 3. The method 700 can be implemented by the social application 160 executing on the mobile device 120 while the mobile device is located at a particular location 100 (FIG. 1).

At step 705 the mobile device 120 can capture or receive, at the particular location, at least one image of the portion of the plurality of people currently located at the particular location. At step 710 the mobile device 120 can read data from, or receiving data read from, at least one RFID tag, the data from the RFID tag including data indicating features of a garment to which the RFID tag is attached and data about a person wearing the garment. At step 715 the mobile device 120 can initiate image recognition processing on the at least one image of the people currently located at the particular location, the image recognition processing comprising determining features of the garment worn by the person. At step 720 the mobile device 120 can compare the data from the RFID tag indicating the features of the garment to the features of the garment determined by the image processing and, based on the comparison, determine whether the data from the RFID tag has at least a threshold level of correlation with the features of the garment determined by the image processing. At step 725 the mobile device 120 can, responsive to determining that the data from the RFID tag has at least the threshold level of correlation with the features of the garment determined by the image processing, identify the data about the person wearing the garment and, based on the data about the person wearing the garment, identifying the person wearing the garment.

FIG. 8 is a flowchart illustrating an example of another method 800 of automatically identify a plurality of people currently located at the particular location at step 305 of FIG. 3. The method 800 can be implemented by the social application 160 executing on the mobile device 120 while the mobile device is located at a particular location 100 (FIG. 1).

At step 805 the mobile device 120 can read data from, or receive data read from, at least one RFID tag worn by or carried by a person, the data from the RFID tag including data about the person. At step 810 the mobile device 120 can, based on the data about the person from the RFID tag, identify the person.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method, comprising:
automatically identifying, by at least a first mobile device currently located at a particular location, a plurality of people currently located at the particular location, wherein the identifying the plurality of people currently located at the particular location comprises:
capturing or receiving, at the particular location, at least one image of a portion of the plurality of people currently located at the particular location;
initiating image recognition processing on the at least one image of the portion of the plurality of people currently located at the particular location, the image recognition processing comprising determining features of at least one garment worn by at least one person of the portion of the plurality of the people depicted in the at least one image;
broadcasting a message to other mobile devices currently located at the particular location, the broadcast message indicating the at least one determined feature of the at least one garment and requesting the person wearing the garment to respond to the message; and
receiving from a mobile device of the person wearing the garment a response to the broadcast message indicating that person's user information; and
responsive to automatically identifying, by at least the first mobile device currently located at the particular location, the plurality of people currently located at the particular location, automatically creating, by at least the first mobile device, a communication group including at least the person wearing the garment.

2. The method of claim 1, wherein:
the at least one image comprises a plurality of images including a first image and at least a second image;
the first image is captured by the first mobile device;
the second image is received, by the first mobile device, from a second mobile device located at the particular location; and
the first mobile device is designated as a master device for handling the plurality of images and the second mobile device is designated as a child device with respect to handling the plurality of images.

3. A system, comprising:
a processor programmed to initiate executable operations comprising:
automatically identifying, by at least a first mobile device currently located at a particular location, a plurality of people currently located at the particular location, wherein the identifying the plurality of people currently located at the particular location comprises:
capturing or receiving, at the particular location, at least one image of a portion of the plurality of people currently located at the particular location;
initiating image recognition processing on the at least one image of the portion of the plurality of people currently located at the particular location, the image recognition processing comprising determining features of at least one garment worn by at least one person of the portion of the plurality of the people depicted in the at least one image;
broadcasting a message to other mobile devices currently located at the particular location, the broadcast message indicating the at least one determined feature of the at least one garment and requesting the person wearing the garment to respond to the message; and
receiving from a mobile device of the person wearing the garment a response to the broadcast message indicating that person's user information; and
responsive to automatically identifying, by at least the first mobile device currently located at the particular location, the plurality of people currently located at the particular location, automatically creating, by at least the first mobile device, a communication group including at least the person wearing the garment.

4. The system of claim 3, wherein:
the at least one image comprises a plurality of images including a first image and at least a second image;
the first image is captured by the first mobile device;
the second image is received, by the first mobile device, from a second mobile device located at the particular location; and
the first mobile device is designated as a master device for handling the plurality of images and the second mobile device is designated as a child device with respect to handling the plurality of images.

5. A computer program product, comprising:
a computer readable storage medium having program code stored thereon, the program code executable by a data processing system to initiate operations including:
automatically identifying, by at least a first mobile device currently located at a particular location, a plurality of people currently located at the particular location, wherein the identifying the plurality of people currently located at the particular location comprises:
capturing or receiving, at the particular location, at least one image of a portion of the plurality of people currently located at the particular location;
initiating image recognition processing on the at least one image of the portion of the plurality of people currently located at the particular location, the image recognition processing comprising determining features of at least one garment worn by at least one person of the portion of the plurality of the people depicted in the at least one image;
broadcasting a message to other mobile devices currently located at the particular location, the broadcast message indicating the at least one determined feature of the at least one garment and requesting the person wearing the garment to respond to the message; and
receiving from a mobile device of the person wearing the garment a response to the broadcast message indicating that person's user information; and
responsive to automatically identifying, by at least the first mobile device currently located at the particular location, the plurality of people currently located at the particular location, automatically creating, by at least the first mobile device, a communication group including at least the person wearing the garment.

6. The computer program product of claim 5, wherein:
the at least one image comprises a plurality of images including a first image and at least a second image;
the first image is captured by the first mobile device;
the second image is received, by the first mobile device, from a second mobile device located at the particular location; and
the first mobile device is designated as a master device for handling the plurality of images and the second mobile device is designated as a child device with respect to handling the plurality of images.

* * * * *